US009986021B2

(12) United States Patent
Peng

(10) Patent No.: US 9,986,021 B2
(45) Date of Patent: May 29, 2018

(54) SERVICE TRANSMISSION METHOD AND DEVICE

(71) Applicant: Institute of Sensing Technology and Business, Beijing University of Posts and Telecommunications, Beijing (CN)

(72) Inventor: Mugen Peng, Beijing (CN)

(73) Assignee: Institute of Sensing Technology and Business, Beijing University of Posts and Telecommunications, Beijing (CN)

( * ) Notice: Subject to any disclaimer, the term of this patent is extended or adjusted under 35 U.S.C. 154(b) by 125 days.

(21) Appl. No.: 15/071,232

(22) Filed: Mar. 16, 2016

(65) Prior Publication Data
US 2016/0278061 A1 Sep. 22, 2016

(30) Foreign Application Priority Data

Mar. 17, 2015 (CN) .......................... 2015 1 0117108

(51) Int. Cl.
*H04W 72/04* (2009.01)
*H04L 29/08* (2006.01)
(Continued)

(52) U.S. Cl.
CPC ................ *H04L 67/10* (2013.01); *H04L 1/00* (2013.01); *H04L 43/08* (2013.01); *H04L 43/16* (2013.01);
(Continued)

(58) Field of Classification Search
None
See application file for complete search history.

(56) References Cited

U.S. PATENT DOCUMENTS

| 2014/0079026 | A1* | 3/2014 | Dimou | ................... | H04W 36/04 |
| | | | | | 370/332 |
| 2014/0286258 | A1* | 9/2014 | Chowdhury | .......... | H04L 1/1812 |
| | | | | | 370/329 |

(Continued)

FOREIGN PATENT DOCUMENTS

| CN | 103401929 A | 11/2013 |
| CN | 103916914 A | 7/2014 |

(Continued)

OTHER PUBLICATIONS

A super base station based centralized network architecture for 5G mobile communication systems; Qian et al.*

(Continued)

*Primary Examiner* — Jay P Patel
(74) *Attorney, Agent, or Firm* — Bookoff McAndrews, PLLC

(57) ABSTRACT

Embodiments of the present disclosure may provide a service transmission method and device. The service transmission method may include: determining, by a user terminal, whether a service of the user terminal is a service needing global cooperation; transmitting, by the user terminal, the service with a global Base Band Unit (BBU) pool mode if the service of the user terminal is the service needing the global cooperation; and transmitting, by the user terminal, the service with a non-global BBU pool mode if the service of the user terminal is the service, which does not need the global cooperation.

18 Claims, 8 Drawing Sheets

(51) Int. Cl.
  *H04L 12/26* (2006.01)
  *H04L 1/00* (2006.01)
  H04W 52/24 (2009.01)
(52) U.S. Cl.
  CPC ........ *H04W 72/048* (2013.01); *H04W 52/244* (2013.01)

(56) References Cited

U.S. PATENT DOCUMENTS

2015/0087324 A1\* 3/2015 Ishida .................. H04W 16/00
   455/452.2
2015/0126235 A1\* 5/2015 Cho .................... H04W 68/005
   455/458

FOREIGN PATENT DOCUMENTS

CN    104053163 A    9/2014
JP    2012095279 A   5/2012

OTHER PUBLICATIONS

Chinese Office Action in corresponding Chinese Application No. 201510117108.3, dated Nov. 22, 2017 (12 pages).

\* cited by examiner

SERVICE TRANSMISSION METHOD AND DEVICE

This application claims the benefit of priority from Chinese Patent Application, No. 201510117108.3, entitled "Service transmission Method" and filed on Mar. 17, 2015, the entire content of which is hereby incorporated by reference.

FIELD OF THE INVENTION

The present disclosure relates to a field of radio communication technology, and more particularly, to a service transmission method and device.

BACKGROUND

A Heterogeneous Cloud Radio Access Network (H-CRAN) is an enhanced access network of a Hierarchical Networking (HetNet) and a Cloud Radio Access Network (C-RAN). The H-CRAN includes: High Power Nodes (HPN)s and Low Power Nodes (LPN)s.

SUMMARY

Embodiments of the present disclosure may provide a service transmission method and device, to reduce capacity requirements of a fronthaul, reduce signal processing pressure of a Base Band Unit (BBU) pool in a cloud computing server and reduce transmission delay.

A service transmission method includes:
determining, by a user terminal, whether a service of the user terminal is a service needing global cooperation;
transmitting, by the user terminal, the service with a global Base Band Unit (BBU) pool mode if the service of the user terminal is the service needing the global cooperation; and
transmitting, by the user terminal, the service with a non-global BBU pool mode if the service of the user terminal is the service, which does not need the global cooperation.

A service transmission device includes: a processor and a non-transitory storage medium storing machine readable instructions.

The machine readable instructions are executed by the processor to:
determine whether a service of a user terminal is a service needing global cooperation;
transmit the service with a global Base Band Unit (BBU) pool mode if the service of the user terminal is the service needing the global cooperation; and
transmit the service with a non-global BBU pool mode if the service of the user terminal is the service, which does not need the global cooperation.

Embodiments of the present disclosure may adopt the edge cloud computing technology and heterogeneous cloud radio access network technology. The coverage of the HPN and the performance for broadcasting the control information may be improved via a large-scale multi-antenna technology. The AP in the conventional C-RAN may be enhanced and the enhanced AP may be called a Fog-Access Point (F-AP). Besides the function modules of the AP, the F-AP may further include a module, used to perform the distributed coordination processing and information forwarding with an adjacent F-AP in a local area. The edge cloud computing in embodiments of the present disclosure may be called fog computing. The edge cloud computing processing-based radio access network may be called the Fog-Radio Access Network (F-RAN). With the edge cloud computing processing-based service transmission method in the embodiments of the present disclosure, the services transmitted by the user terminal may be classified and identified. The service, which does not need the global cooperation may be processed with the HPN access mode, terminal D2D mode or local F-AP mode to reduce the capacity requirements of the fronthaul and the signal processing pressure of the BBU pool in the cloud computing server and reduce the transmission delay. On the other hand, the service, which may need the global cooperation, resource management and mobility management may be sent to the BBU pool in the cloud computing server via the fronthaul. The large-scale cooperation processing grain may be obtained, the cost of the network constructing and operation may be reduced, the network performance may be improved and the energy consumption may be reduced via the large-scale coordination centralized processing technology.

DETAILED DESCRIPTION

For simplicity and illustrative purposes, the present disclosure is described by referring mainly to example(s) thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used throughout the present disclosure, the term "includes" means includes but not limited to, the term "including" means including but not limited to. The term "based on" means based at least in part on. In addition, the terms "a" and "an" are intended to denote at least one of a particular element.

A HPN is backwards compatible with a cell mobile communication system and a bandwidth radio access system and ensures seamless coverage of multi-antenna radio networks. The HPN has the function of radio resource management, mobility management and a heterogeneous convergence gateway. The HPN may be a macro base station, micro base station, a new super base station or a cloud base station. The HPN may be used to implement large-scale seamless coverage, transmission of broadcast control information of the whole network and heterogeneous network convergence function, etc.

The LPN provides high-speed services in a local area. The LPN may be a small station in the HetNet or an in the H-CRAN. In the H-CRAN, the RRH may process front-end Radio Frequency (RF) signals and simple symbols. The baseband signal physical processing and radio resource management control is implemented by the BBU pool in the large-scale cloud computing server. As the social application and location-based communication application is more and more popular, in the same area, more and more data traffic needs to be transmitted by the adjacent or same RRHs. Since all the above data traffic needs to be transmitted to the cloud computing server, a large amount of data should be transmitted by the fronthaul between the BBU pool in the cloud computing server and the RRH. Since a large amount of redundant services and control information are transmitted by the fronthaul, the capacity of the fronthaul is limited and the signal processing burden of the BBU pool in the cloud computing server is increased.

Embodiments of the present disclosure provide a service transmission solution to reduce capacity requirements of a fronthaul, reduce signal processing pressure of a Base Band Unit (BBU) pool in a cloud computing server and reduce transmission delay.

Figure 1:
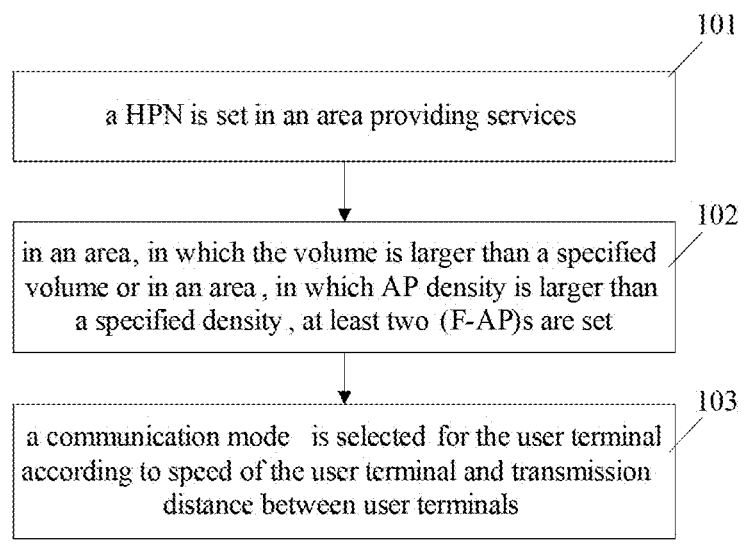
FIG. 1 is a flow chart illustrating a service transmission method in accordance with various embodiments of the present disclosure.

FIG. 1 is a flow chart illustrating a service transmission method based on edge cloud computing in accordance with various embodiments of the present disclosure. Referring to FIG. 1, the edge cloud computing-based service transmission method may include following blocks.

At block 101, according to network planning, a HPN may be set in an area providing services. That is, the HPN may be set in a seamlessly-covered area or in an area, which may ensure seamless access of a user terminal.

The HPN in embodiments of the present disclosure may be a macro base station or micro base station, or enhanced macro base station or cloud base station with large-scale multi-antenna. The HPN may be backwards compatible with a cell mobile communication system and ensure seamless coverage of multiple wireless networks. The HPN may have the function of the physical layer, data link layer and the network layer, have the convergence function of the heterogeneous cloud radio access network and may implement heterogeneous coordinative convergence with other heterogeneous APs, such as APs in a Wireless Local Area Network (WLAN) or Wireless Metropolitan Area Network (WMAN) or millimeter-wave visible light APs. The HPN may have a dynamic real-time return link interface for connecting with the BBU pool in the cloud computing server to implement the coordinative signal processing, radio resource management and mobility management between the HPN and the BBU pool in the cloud computing server.

At block 101, in order to implement seamless coverage or ensure that the radio user terminal may seamlessly access the network, in the whole heterogeneous radio access network, the HPN may be configured according to the network planning, the amount of services of each area and the coverage scope of the HPN. In embodiments of the present disclosure, the HPN may be a macro base station or micro base station, or enhanced macro base station or cloud base station with large-scale multi-antenna. The HPN may implement the processing function of the service data and control information and provide service data and/or control signaling with its RF transmitter and baseband processing equipment.

In order to improve the transmission efficiency, each HPN may be equipped with large-scale antennas, allocated with corresponding spectrum resources and basic parameters to provide basic service coverage for the radio access network. The adaptive beam-forming of the large-scale antennas may be implemented by a communication point, to which the communication terminal of the user terminal may access. The HPN may further have the convergence function of the heterogeneous cloud radio access network and may implement heterogeneous coordinative convergence with other heterogeneous APs to exchange resources with the other heterogeneous APs. The HPN may connect with the BBU pool in the cloud computing server via the dynamic real-time return link interface to implement the coordinative signal processing, radio resource management and mobility management between the HPN and the BBU pool in the cloud computing server.

Figure 2:
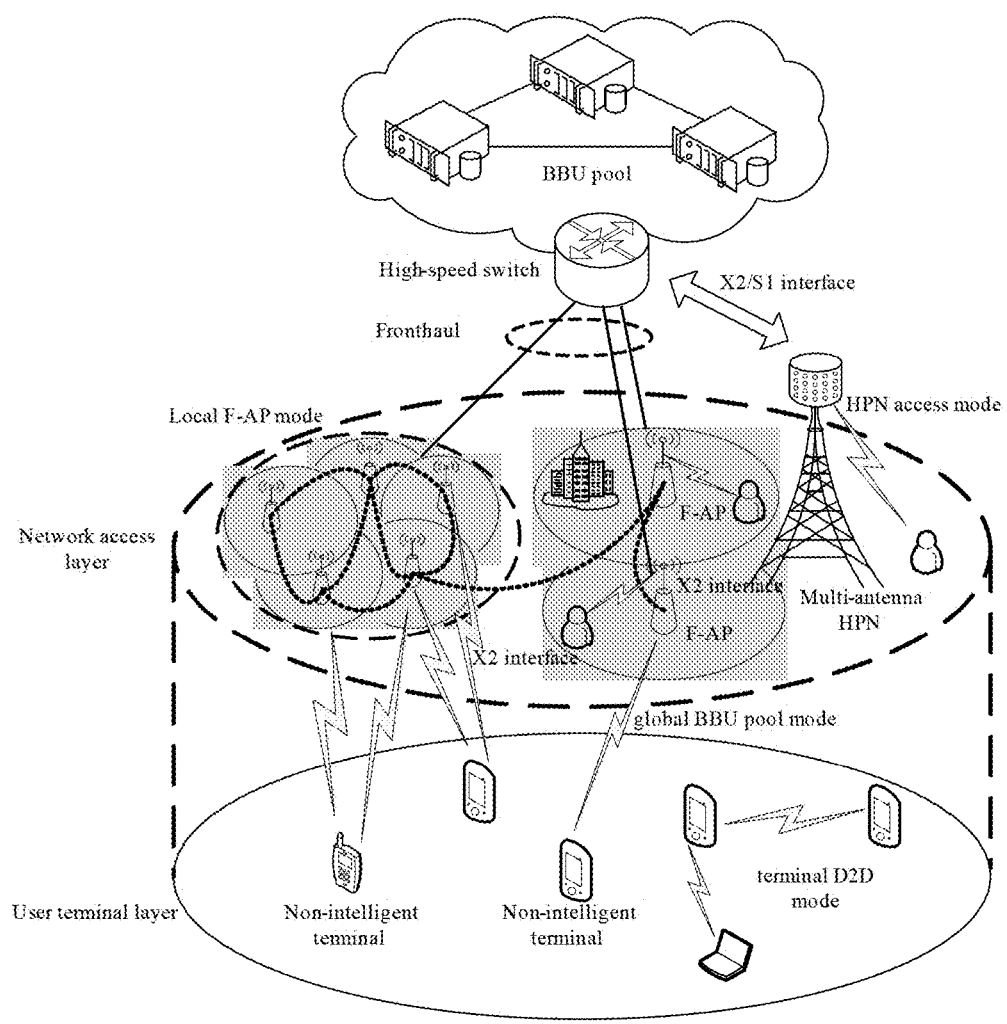
FIG. 2 is a diagram illustrating edge cloud computing processing-based radio communication networking in accordance with various embodiments of the present disclosure.

At block 102, in an area, in which the volume is larger than a specified volume or in an area, in which AP density is larger than a specified density, at least two Frog-Access Points (F-AP)s may be set or added. The F-AP may have a frog computing baseband signal processing module for implementing capacity absorption in a hotspot. FIG. 2 is a diagram illustrating edge cloud computing processing-based radio communication networking in accordance with various embodiments of the present disclosure. As shown in FIG. 2, the F-AP not only has the front-end RF signals and simple symbols processing module possessed by the AP, but also has the baseband signal physical processing and radio resource management control module to implement distributed coordination communication with adjacent other F-APs and may directly communicate with the communication terminal accessing the F-AP and perform resource management. Each F-AP may connect with the BBU pool and in the cloud computing server with the fronthaul, may have a service interface and control interface for connecting with the adjacent F-APs and may interconnect with multiple F-APs in a local area via a Mesh topology, Tree topology, Linear topology or Star topology.

In an embodiment of the present disclosure, the F-AP may be an F-RRH.

The block 102 may further include following operations.

In the area, in which the volume is larger than the specified volume or in the area, in which AP density is larger than a specified density, at least two F-APs may be set or added. The F-APs may connect with the BBU pool in the cloud computing server via the fronthaul. The F-APs may connect with each other via X2 interfaces to form the Mesh topology, Tree topology, Linear topology or Star topology.

Figure 4:
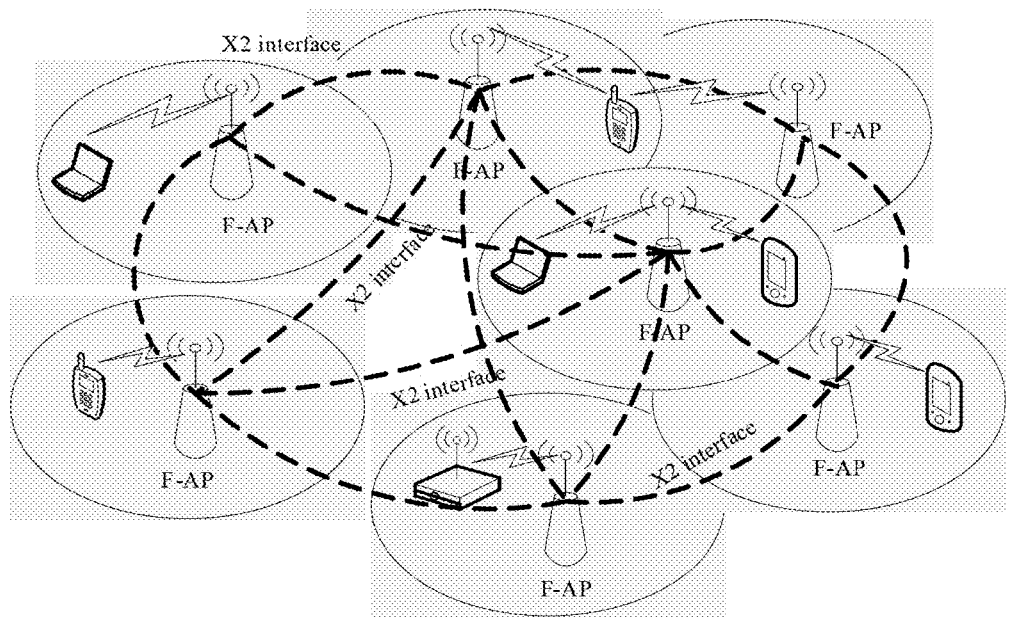
FIG. 4 is a diagram illustrating a network constructed by Fog-Access Point (F-AP)s using a Mesh networking method in accordance with various embodiments of the present disclosure.
Figure 5:
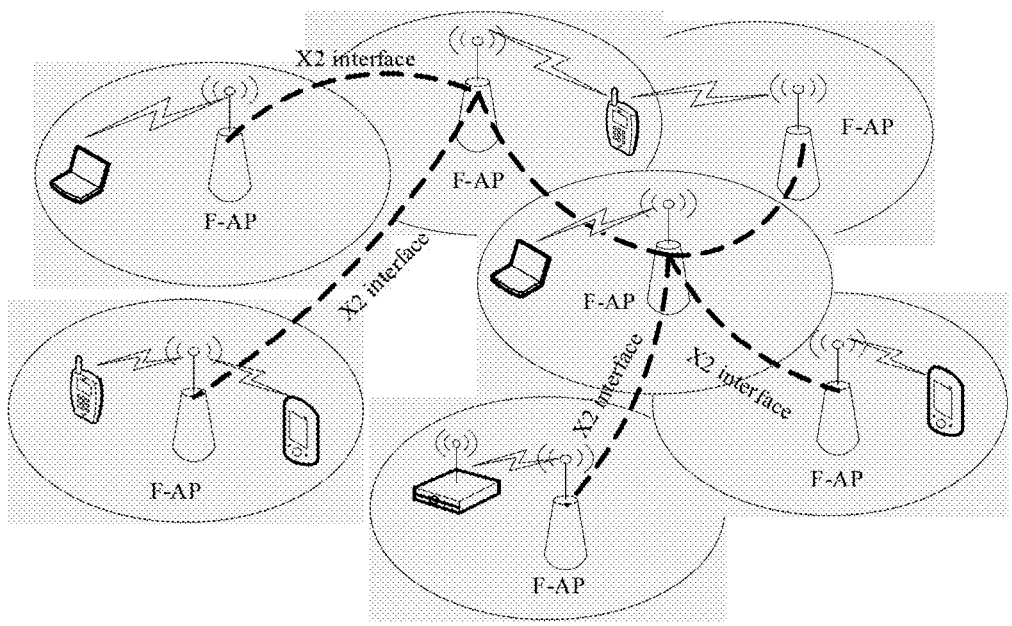
FIG. 5 is a diagram illustrating a network constructed by the F-APs using a tree networking method in accordance with various embodiments of the present disclosure.

FIG. 4 is a diagram illustrating a network constructed by F-APs using a Mesh networking method in accordance with various embodiments of the present disclosure. Each F-AP may connect with another F-AP via an X2 interface. A radio Mesh topology may be formed with the management of the BBU pool in the cloud computing server. When an F-AP in the network is failed or cannot provide services, the BBU pool in the cloud computing server may adjust and allocate the resources and transmit information via constructing a new route. FIG. 5 is a diagram illustrating a network constructed by the F-APs using a tree networking method in accordance with various embodiments of the present disclosure. Each F-AP connects with another F-AP via an X2 interface to form a radio Tree topology architecture. The F-APs in the radio Tree topology architecture may connect with a new F-AP to enlarge the radio Tree topology, which may be convenient for the management of the F-APs.

The F-AP in the area described in the above block 102 may have certain baseband signal processing abilities for independently processing the services and control signals, directly communicating with the communication terminal of the user terminal and performing resource management. The F-AP and adjacent F-APs in the area may form large-scale coordinative multipoint transmission node cluster via a distributed coordination communication mode and implement coordinative transmission in a local area via the network topology architecture among the F-APs with the management of the BBU pool in the cloud computing server. Alternatively, the BBU pool in the cloud computing server may adopt the centralized virtual pre-coding, user terminal scheduling, resource and mobility management. The BBU pool in the cloud computing server may execute all signaling control functions of the radio communication resources between each F-AP and the user terminal, such as synchronization, access, channel establishment, data transmission and channel release, so that the multiple F-APs may perform global coordination to enhance the transmission efficiency of the whole network.

At block 103, a communication mode, i.e. a mode that the communication terminal accesses the F-RAN may be selected for the user terminal according to speed of the user terminal and transmission distance between user terminals.

In an embodiment of the present disclosure, the modes that the user terminal accesses the F-RAN may include: an HPN access mode, a local F-AP mode and a global BBU pool mode. In this embodiment, the communication terminal of the user terminal may implement the communication via accessing the F-AP.

In an embodiment of the present disclosure, the communication terminal may be a new D2D terminal with a D2D function. The new D2D terminal may have the ability of finding an adjacent D2D terminal and detecting configured feedback information and have the ability of reporting information, such as location information, charging information and interference information to the F-AP. In this embodiment, the four modes that the user terminal accesses the F-RAN may include: the HPN access mode, terminal D2D mode, local F-AP mode and global BBU pool mode.

Figure 3:
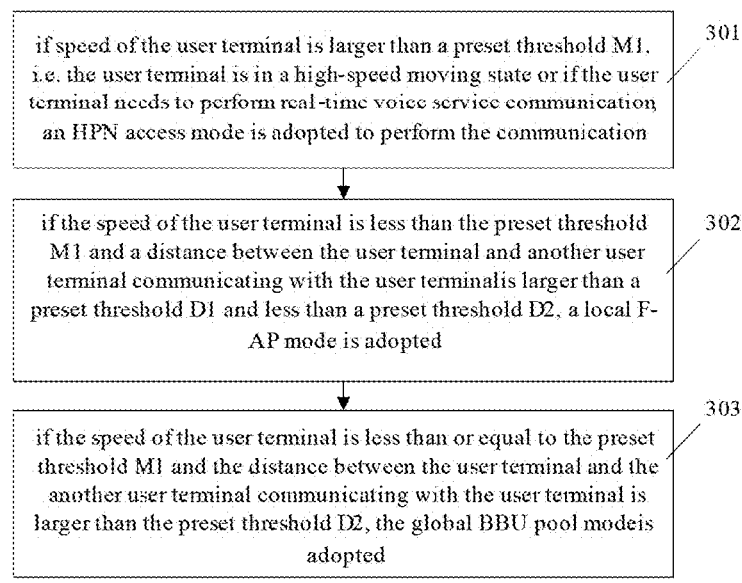
FIG. 3 is a flow chart illustrating a service transmission method in accordance with various embodiments of the present disclosure.

FIG. 3 is a flow chart illustrating a service transmission method in accordance with various embodiments of the present disclosure. Referring to FIG. 3, when a user terminal accesses the F-RAN, following blocks may be included.

At block 301, if speed of the user terminal is larger than a preset threshold M1, i.e. the user terminal is in a high-speed moving state or if the user terminal needs to perform real-time voice service communication, an HPN access mode may be adopted to perform the communication. That is, the communication terminal of the user terminal may directly access the HPN.

At block 302, if the speed of the user terminal is less than the preset threshold M1 and a distance between the user terminal and another user terminal communicating with the user terminal is larger than a preset threshold D1 and less than a preset threshold D2, a local F-AP mode may be adopted. That is, the user terminal may communicate with other user terminals via accessing the F-AP. Multiple F-APs may implement distributed coordination communication in local interaction under the management of the BBU pool in the cloud computing server.

In an embodiment of the present disclosure, before adopting the local F-AP mode, the method may further include: making, by the BBU pool in the cloud computing server, a determination as to whether the F-AP communication may satisfy service communication requirements and adopting, by the user terminal, the local F-AP mode if the F-AP communication satisfies the service communication requirements and adopting, by the user terminal, the global BBU pool mode if the F-AP communication does not satisfy the service communication requirements.

At block 303, if the speed of the user terminal is less than or equal to the preset threshold M1 and the distance between the user terminal and the another user terminal communicating with the user terminal is larger than the preset threshold D2, the global to BBU pool mode may be adopted. All communication processing operations may be integrated and processed by the BBU pool in the cloud computing server.

In an embodiment of the present disclosure, the communication terminal may be a new D2D terminal with the D2D function. The new D2D terminal may have the ability of finding an adjacent D2D terminal and detecting configured feedback information and have the ability of reporting information, such as location information, charging information and interference information to the F-AP. In this embodiment, if the speed of the user terminal is less than or equal to the preset threshold M1, the distance between the user terminal and the another user terminal communicating with the user terminal is less than the present threshold D1 and both the user terminal and the another user terminal communicating with the user terminal may have the D2D module and access the same F-AP, the user terminal may adopt the terminal D2D mode. The two user terminals may implement the communication via the terminal D2D technology with the management of the F-AP, to which they may access.

If the speed of the user terminal is less than or equal to the preset threshold M1, the distance between the user terminal and the another user terminal communicating with the user terminal is less than the preset threshold D1 and the either of the user terminal and the another user terminal communicating with the user terminal does not have the D2D module or the two user terminals access different F-APs, the terminal D2D mode cannot be adopted and local F-AP mode may be adopted. Before the local F-AP mode is adopted to perform the communication, the method may further include: making, by the BBU pool in the cloud computing server, a determination as to whether the F-AP communication may satisfy service communication requirements and adopting, by the user terminal, the local F-AP mode if the F-AP communication satisfies the service communication requirements and adopting, by the user terminal, the global BBU pool mode if the F-AP communication cannot satisfy service communication requirements.

The terminal D2D mode may be described hereinafter.

The F-AP may allocate an identifier for each user terminal covered by the F-AP. The user terminals communicating with each other may include: a first user terminal and a second user terminal. The first user terminal may broadcast its local location and an identifier of the first user terminal. After the second user terminal receives the information broadcast by the first user terminal, the second user terminal may broadcast its location information and an identifier of the second user terminal with a frequency band, which may be the same as that used by the first user terminal. After the first user terminal receives the information broadcast by the second user terminal, the first user terminal may send acknowledgement information with the frequency and change its state to a connected state. After the second user terminal receives the acknowledgement and changes its state to the connected state, the first user terminal and the second user terminal may start to communicate with each other.

The local F-AP mode may be described hereinafter.

The user terminal may evaluate strength of a detected radio signal according to the location and channel state information of the user terminal to obtain information, such as transmission power and load conditions of different F-APs, transmission service characteristics of the user terminal, performance limit of the return link, rank the F-APs in an order from high energy efficiency to low energy efficiency. The user terminal may access the F-AP with the highest energy efficiency. If the F-AP with the highest energy efficiency does not have spare idle resources, which may be allocated or the fronthaul of the F-AP with the highest energy efficiency is limited, the user terminal may access an F-AP with second-highest energy efficiency. The F-AP may report data except for the service requirements of the user terminal to the BBU pool in the cloud computing server. The BBU pool may manage at least two F-APs according to the reported network state information and enable the F-APs to perform the local interaction coordinative communication at local.

The block 103 may be further described hereinafter. The block 103 may include following operations.

At (31), if the speed of the user terminal is larger than the present threshold M1, i.e. the user terminal is in a high-speed moving state or if the user terminal needs to perform basic real-time voice service communication, an HPN access mode may be adopted. That is, the communication terminal of the user terminal may access the HPN and the HPN may implement all subsequent signal processing functions.

Alternatively, if the speed of the user terminal is less than the preset threshold M1, the two user terminals communicating with each other may access the same F-AP, the distance between the two user terminals is less than the preset threshold D1 and the two user terminals are new D2D terminals, the user terminal may adopt the terminal D2D mode with the control and management of the F-AP, to which the two user terminals may access. That is, the two user terminals may implement the communication between the user terminals via the terminal D2D technology.

The terminal D2D mode may include that the F-AP may allocate an equipment identifier for each user terminal covered by the F-AP. The user terminals communicating with the user terminal may include: a first user terminal and a second user terminal. The first user terminal may broadcast its local and equipment identifier. After the second user terminal receives the information broadcast by the first user terminal, the second user terminal may broadcast its location and equipment identifier with a frequency band, which may be the same as that used by the first user terminal. After the first user terminal receives the information broadcast by the second user terminal, the first user terminal may send acknowledgement information with the frequency band and change its state to a connected state. After the second user terminal receives the acknowledgement information and changes its state to the connected state, the first user terminal and the second user terminal may start to communicate with each other.

At (32), if the communication service requirement between the user terminals is low, the speed of the user terminal is less than the preset threshold M1, the distance between the user terminals communicating with each other is larger than D1 but less than the present threshold D2, or the distance between the user terminals communicating with each other is less than the preset threshold D1, but 1) either of the user terminals does not have the D2D module, or 2) the user terminals access different F-APs, the local F-AP mode may be adopted. That is, the user terminals may communicate with each other via accessing the F-AP.

The local F-AP mode may include following operations. The user terminal may evaluate strength of a detected radio signal according to the location information and channel state information of the user terminal to obtain information, such as transmission power and load of different F-APs, transmission service characteristics of the user terminal, performance limit of the return link, rank the F-APs in an order from high energy efficiency to low energy efficiency. The user terminal may access the F-AP with the highest energy efficiency. If the F-AP with the highest energy efficiency does not have spare idle resources, which may be allocated or the fronthaul of the F-AP with the highest energy efficiency is limited, the user terminal may access an F-AP with second-highest energy efficiency, and so on. The F-AP may report data except for the service requirements of the user terminal to the BBU pool in the cloud computing server. The BBU pool may manage at least two F-APs according to the reported network state information and enable the F-APs to perform the local interaction coordinative communication at local.

If the F-AP communication cannot satisfy the service communication requirements, the global BBU pool mode may be adopted. The global BBU pool mode may include that the information reported by the user terminal to the F-AP is same as that reported by the user terminal when the local F-AP mode is used. However, the F-AP may report all the signal processing, resource management and service requirement information to the BBU pool. The BBU pool may eliminate interference and improve the performance of the system via large-scale integrated pre-coding to drive each F-AP to provide communication service for the user terminal.

At (33), if the speed of the user terminal is less than the preset threshold M1, the distance between the user terminals communicating with each other is larger than the preset threshold D2, the user terminal may access the C-RAN network using the C-RAN network access mode, i.e. the global BBU pool mode. The user terminal may select the best F-AP to access according to its local information and channel state information. The each F-AP may report all the information of the user terminal and the service requirement to the BBU pool via the fronthaul. The BBU pool may control the signal control function of all the radio communication resources between the each F-AP and the user terminal, such as synchronization, access, channel establishment, data transmission and channel release, and exchange the data transmitted between the user terminals to implement the communication between the user terminals.

In an embodiment of the present disclosure, when the terminal D2D mode is adopted, block 104 may be further included. That is, the F-AP may adjust its transmitting power for the controlled D2D terminals (including the first user terminal and the second user terminal) according to channel packet loss rate, throughput, network transmission delay and channel usage. As for the user terminal using a non-D2D access mode, the BBU pool in the cloud computing server may periodically adjust the transmitting power of the F-AP via coordinating signaling interaction between the HPN according to the volume, packet loss rate, throughput and network transmission delay, update the communication mode of the non-D2D terminal, schedule and allocate resources for the user terminal via the statistical Channel State Information (CSI), instant Queue State Information (QSI) and the mobility of the user terminal.

At (41), after the user terminal access the F-RAN via the terminal D2D mode, the F-AP may periodically detects the performance of the two D2D terminals controlled by the F-AP. If transmission quality performance index parameters of the two D2D terminals, such as the channel packet loss rate, throughput and network transmission delay are respectively in preset thresholds, the transmitting power of the F-AP may not be changed.

Alternatively, if any of the transmission quality performance index parameters of the two D2D terminals are reduced and less than its preset threshold and the transmission quality performance index parameters of other two adjacent D2D terminals are in preset thresholds, the F-AP may increase its the transmitting power for each of the D2D terminals; otherwise, the F-AP may detect the resource occupation situation in the current network, if the current network has idle resources, a channel which may be orthogonal to the network resources may be allocated for communication. If the current network does not have idle resources, the two D2D terminals may use another communication mode.

Alternatively, (42) as for the user terminal, which may not use the non-D2D access mode, the BBU pool in the cloud computing server may periodically compute the volume, packet loss rate, throughput and network transmission delay of the F-AP according to fog, adjust the transmitting power of the F-AP via coordinating with the HPN, the BBU pool may update the communication mode used by the non-D2D terminals, schedule the user terminals and allocate resources for the user terminals according to the statistical CSI, instant QSI and the mobility of the user terminal.

If the total volume of the F-AP is in the preset threshold and three transmission quality performance index parameters, i.e. the packet loss rate, throughput and network transmission delay are in respective thresholds, the transmitting power of the F-AP may not be changed.

Alternatively, if the total volume of the F-AP is keeping larger than the preset threshold or the real-time processing function of the heterogeneous radio access network is limited, when any of the three transmission quality performance index parameters is reduced and less than the preset threshold, a determination that the system may be in a high volume state may be made. The F-AP may increase its transmitting power and adjacent F-APs may start. The user terminal may access the best HPN or F-AP according to an energy efficiency index and perform large-scale radio resources scheduling, allocate baseband signals from the F-AP with the high volume to the specified baseband processing unit in the cloud computing server. In an extreme situation, the F-AP with the high volume may use the radio resources of the adjacent F-AP.

Alternatively, if the total volume of the F-AP is keeping less than the preset threshold and the three transmission quality performance index parameters of the heterogeneous radio access network are larger than the preset thresholds, a determination that the system may be in a low volume state may be made. The F-AP may reduce its transmitting power or handover the user terminal to an adjacent F-AP according to the energy efficiency index, and then close the F-AP.

In the service transmission method in an embodiment of the present disclosure, anti-interference processing may be performed in the communication phase of the user terminal. The following block 105 may be described hereinafter.

At block 105, in the communication phase of the user terminal:

When the communication is performed using the terminal D2D mode, as for the interference between the F-AP and a D2D terminal controlled by the F-AP, the F-AP may adjust the D2D terminal to an idle channel and perform corresponding radio resource management operation or handover a user terminal causing much interference to a non-D2D access mode with interference information reported by the D2D terminal, the link scheduling and channel occupation history information stored in the F-AP to avoid the interference.

When the communication is performed using the local F-AP mode, an inter-LPN interference coordination processing method in the HetNet may be applied to the user terminals using the local F-AP mode to reduce the interference between the F-APs and enhance the transmission performance.

When the communication is performed using the global BBU pool mode, as for the user terminals adopting the global BBU pool mode, the BBU pool in the cloud computing server may execute the centralized precoding, restrain interference in a process of transmitting and perform serial interference elimination processing in a process of receiving to implement large-scale interference coordination processing.

As for the interference between the HPN and the F-AP, the HPN may perform space-domain interference coordination processing by performing large-scale multi-antenna precoding and serial interference elimination. Under the management of the BBU pool in the cloud computing server, the F-AP may perform the space-domain interference coordination processing by limiting the transmitting power and performing the distributed coordination scheduling.

Figure 6A:
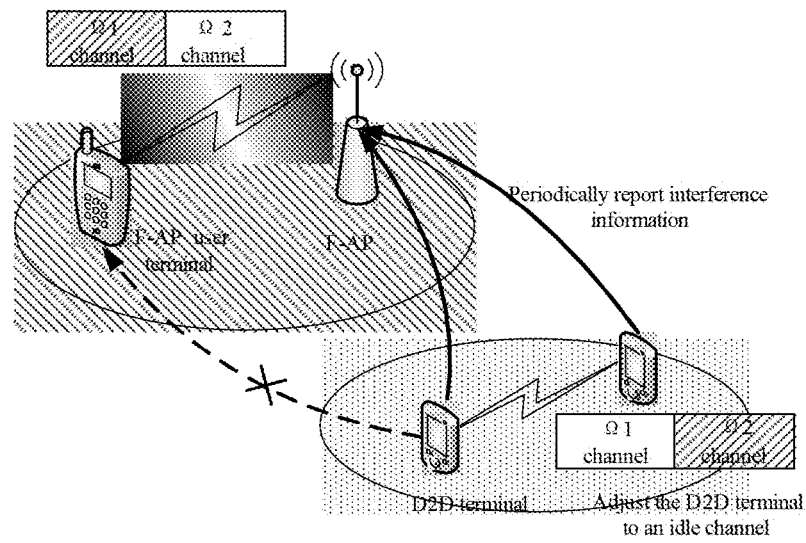
FIG. 6a is a diagram illustrating processing of interference between a Device-to-Device (D2D) terminal and F-AP in a communication phase in accordance with various embodiments of the present disclosure.

The above block 105 may perform following operations:

(51) As for the terminal D2D mode, the two D2D terminals may periodically report its interference information, if 1) the interference with an F-AP user terminal caused by the two D2D terminals is larger than a threshold N1, but does not exceed a threshold N2 and 2) there are available idle resources in the current network, the F-AP may adjust the two D2D terminals to the idle channel according to the reported information and the link scheduling and channel occupation history information stored in the F-AP. As shown in FIG. 6a, the two D2D terminals and the F-AP user terminal may occupy a Ω1 channel, resulting in that the interference may exceed the threshold N1. Therefore, the two D2D terminals may be adjusted to an idle Ω2 channel to eliminate the interference and re-perform the radio resource management operation such as the user terminal access and power allocation, etc. If the interference caused by the two D2D terminals exceeds the threshold N2 and there is no available idle resource in the current network, the non-D2D access mode may be applied to the two D2D terminals and an interference coordination method in the non-D2D access mode may be used to reduce interference.

Figure 6B:
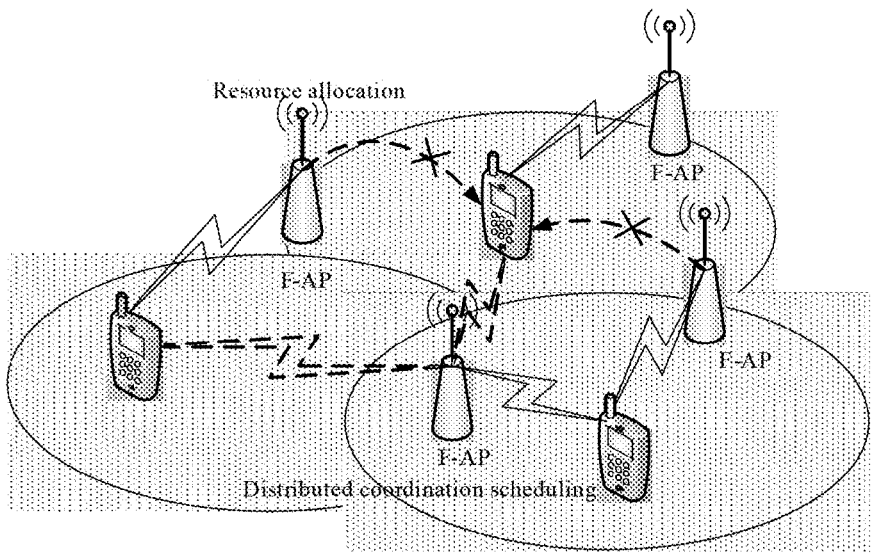
FIG. 6b is a diagram illustrating processing of interference between the F-APs in accordance with various embodiments of the present disclosure.

Alternatively, (52) as for the interference between the F-APs in the local F-AP mode, as shown in FIG. 6b, the user terminal may access a specified F-AP according to location information of the user terminal and channel state information. If Signal to Interference Ratio (SIR) of the user terminal is larger than a threshold R1, no changing is needed. If the SIR of the user terminal is less than or equal to the threshold R1, the F-AP may analyze the source of the interference received by the user terminal and generate an interference coordination instruction. Then, the F-AP may instruct that the F-AP may perform the resource scheduling with an adjacent F-AP causing the interference, using an interface between the F-AP and the adjacent F-AP causing the interference. If the adjacent F-AP causing the interference has other available frequency resources, the adjacent F-AP causing the interference may release resources causing interference with a serving F-AP of the user terminal via a resource allocation mode to reduce the interference. If the adjacent F-AP causing the interference does not have available resources, the serving F-AP of the user terminal and the adjacent F-AP causing the interface may perform joint transmission on the current frequency band, convert the interference signal into the available signal to implement distributed coordination scheduling and reduce interference.

Figure 6C:
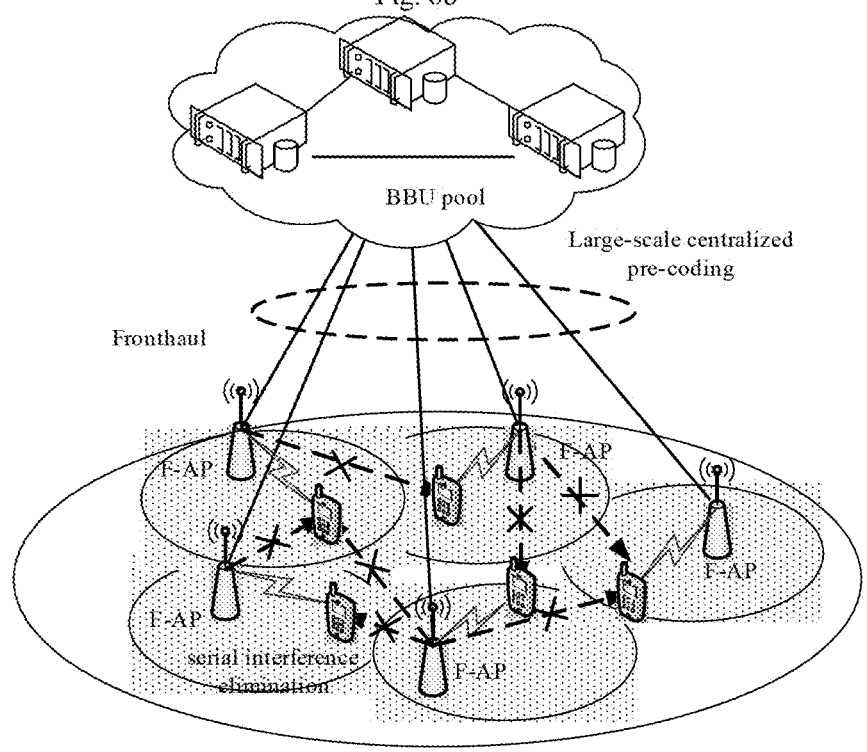
FIG. 6c is a diagram illustrating interference processing in a global BBU mode in accordance with various embodiments of the present disclosure.

Alternatively, (53) as for the global BBU pool, as shown in FIG. 6c, when the F-AP and the user terminal performs downlink communication, the user terminal may periodically report its information, such as location information and channel state to the F-AP. The F-AP may report the information to the BBU pool via a fronthaul. The BBU pool may perform large-scale centralized virtual precoding operation according to the information and construct zero-interference channel zone. The F-AP may perform signal transmission according to a virtual precoding vector to eliminate DL interference and improve network performance. When the F-AP performs UL communication with the user terminal, the user terminal may report information of interference from other objects to the F-AP. The F-AP may report the information of interference to the BBU pool. The BBU pool may perform large-scale serial interference elimination computation to recover the UL signal transmitted by the each user terminal to implement the large-scale interference coordination processing.

Figure 6D:
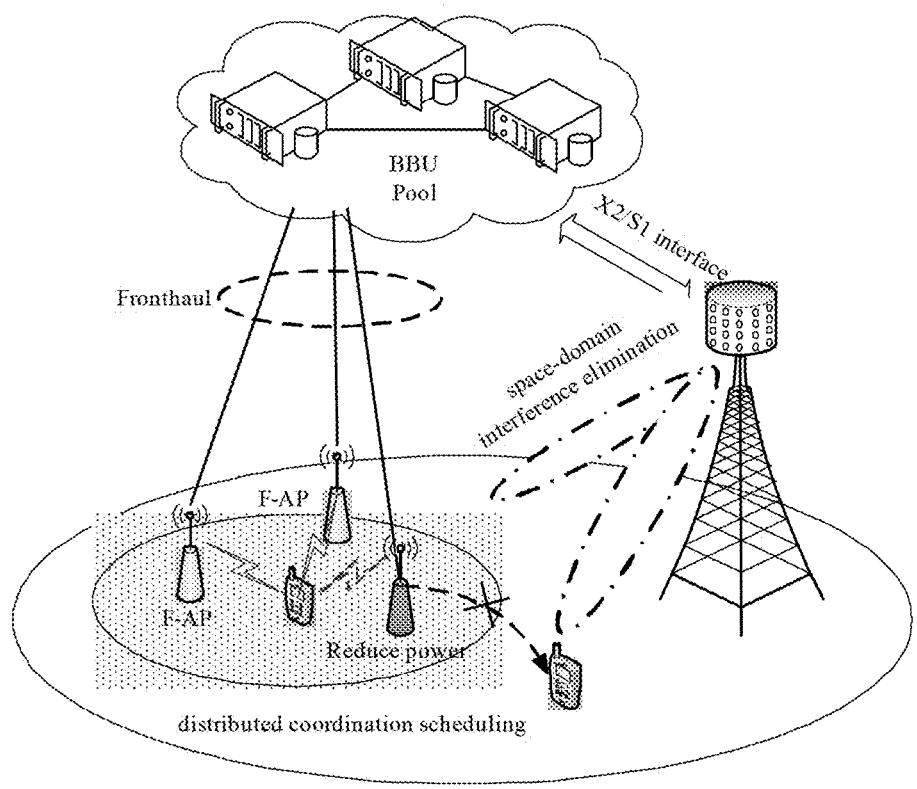
FIG. 6d is a diagram illustrating processing of interference between an HPN and an F-AP in accordance with various embodiments of the present disclosure.

Alternatively, (54) as for the interference between the F-AP and the HPN, the HPN and the BBU pool in the cloud computing server may perform real-time dynamic interaction for interference information and a statistical performance index of same resources via an interface between the HPN and the BBU pool and perform following operations. As shown in FIG. 6d, 1) the HPN may perform large-scale multi-antenna precoding according to location information of F-AP user terminals heavily interfered by the HPN and channel state information and the channel state information and the F-AP user terminals may perform serial interference elimination processing to make interference from the HPN reduced and achieve the objective of space-domain interference coordination processing. 2) The transmitting power of the F-AP heavily interfering with the HPN user terminal may be limited while the network performance is ensured. The BBU pool and other F-APs may perform the power control and resource scheduling to implement the distributed coordination scheduling and may coordinate time-frequency resources to implement the UL and DL interference coordination between the HPN and the F-AP.

Figure 7:
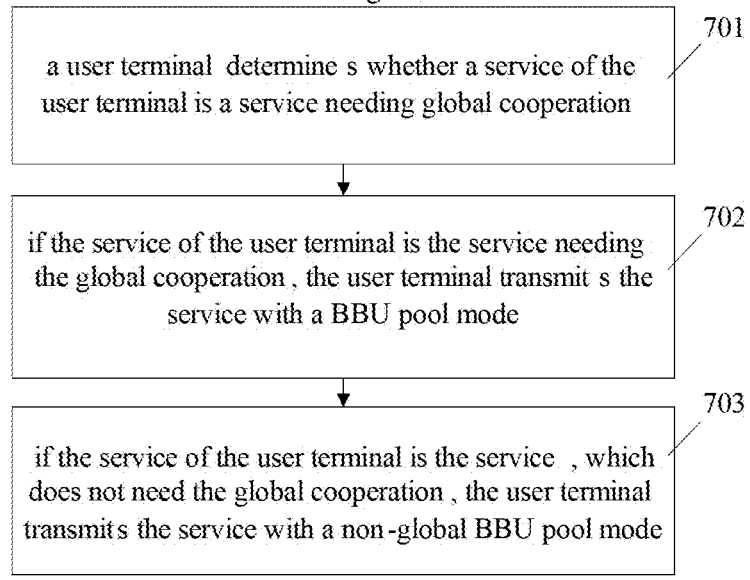
FIG. 7 is a flow chart illustrating another service transmission method in accordance with various embodiments of the present disclosure.

FIG. 7 is a flow chart illustrating another service transmission method in accordance with various embodiments of the present disclosure. As shown in FIG. 7, following blocks may be included.

At block 701, a user terminal may determine whether a service of the user terminal is a service needing global cooperation.

At block 702, if the service of the user terminal is the service needing the global cooperation, the user terminal may transmit the service with a BBU pool mode.

At block 703, if the service of the user terminal is the service, which does not need the global cooperation, the user terminal may transmit the service with a non-global BBU pool mode.

In an embodiment of the present disclosure, the non-global BBU pool mode may include an HPN access mode, terminal D2D mode or local F-AP mode.

Figure 8:
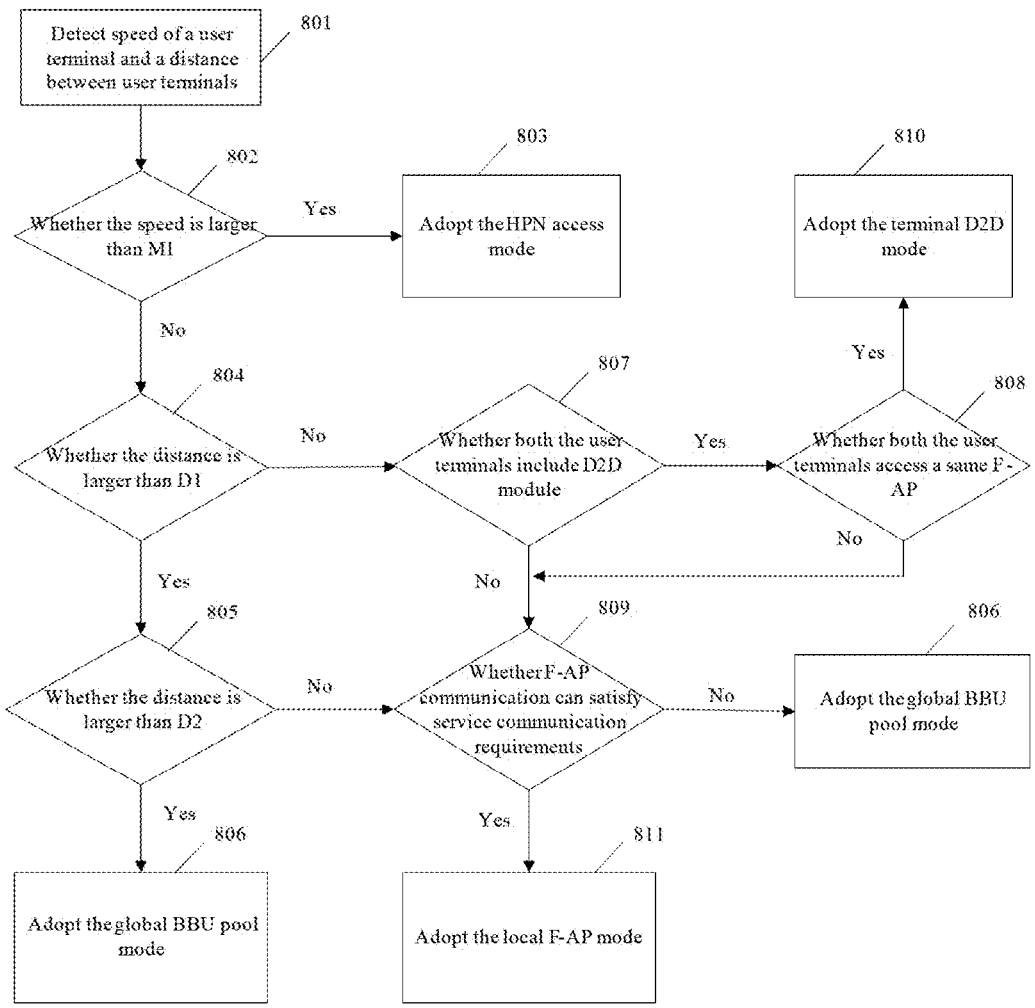
FIG. 8 is a flow chart illustrating a more detailed service transmission method in accordance with various embodiments of the present disclosure.

FIG. 8 is a flow chart illustrating a more detailed service transmission method in accordance with various embodiments of the present disclosure. FIG. 8 may include following blocks.

At block 801, detect speed of a user terminal and a distance between the user terminal and another user terminal communicating with the user terminal.

At block 802, determine whether the speed of the user terminal is larger than M1. M1 may be a positive integer. If the speed of the user terminal is larger than M1, block 803 may be executed. If the speed of the user terminal is less than or equal to M1, block 804 may be executed.

At block 803, adopt the HPN access mode.

At block 804, determine whether the distance between the user terminal and the another user terminal communicating with the user terminal is larger than D1. D1 may be a positive integer. If the distance is larger than D1, block 805 may be executed. If the distance is less than or equal to D1, block 807 may be performed.

At block 805, determine whether the distance between the user terminal and the another user terminal communicating with the user terminal is larger than D2. D2 may be a positive integer. D2 may be larger than D1. If the distance is larger than D2, block 806 may be executed. If the distance is less than or equal to D2, block 809 may be executed.

At block 806, adopt the global BBU pool mode.

At block 807, determine whether both the user terminals communicating with each other include a D2D module. If both the user terminals include the D2D module, block 808 may be executed. If either of the two user terminals does not include the D2D module, block 809 may be executed.

At block 808, determine whether both the user terminals access a same F-AP, if both the user terminals access the same F-AP, block 810 may be executed. If the user terminals do not access the same F-AP, block 809 may be executed.

At block 809, determine whether the F-AP communication can satisfy service communication requirements. If the F-AP communication may satisfy the service communication requirements, block 811 may be executed. If the F-AP communication cannot satisfy the service communication requirements, block 806 may be executed.

At block 810, adopt the terminal D2D mode.

At block 811, adopt the local F-AP mode.

Figure 9:
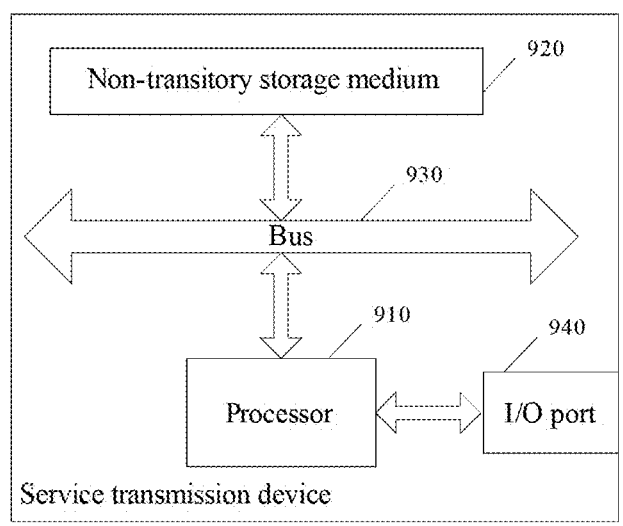
FIG. 9 is a diagram illustrating structure of a service transmission device in accordance with various embodiments of the present disclosure.

FIG. 9 is a diagram illustrating structure of a service transmission device in accordance with various embodiments of the present disclosure.

Referring to FIG. 9, the service transmission device may include: a processor 910, a non-transitory storage medium 920, a bus 930 and an I/O port 940.

The non-transitory storage medium 920 may connect with the processor 910 and the bus 930. The processor 910 may communicate with an external device via the I/O port 940.

The non-transitory storage medium 920 may store machine readable instructions.

The processor 910 may communicate with the non-transitory storage medium 920 and execute the machine readable instructions in the non-transitory storage medium 920 to execute the above methods shown in FIG. 7 and FIG. 8.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A service transmission method, comprising:
   determining, by a user terminal, whether a service of the user terminal is a service needing global cooperation;
   transmitting, by the user terminal, the service with a global Base Band Unit (BBU) pool mode if the service of the user terminal is the service needing the global cooperation; and
   transmitting, by the user terminal, the service with a non-global BBU pool mode if the service of the user terminal is the service, which does not need the global cooperation;
   wherein if the service of the user terminal is the service needing the global cooperation, transmitting, by the user terminal, the service with the global BBU pool mode comprises:
   transmitting, by the user terminal, the service with the global BBU pool mode if speed of the user terminal is less than a threshold M1, a distance between the user terminal and another user terminal communicating with the user terminal is larger than a threshold D2; or
   transmitting, by the user terminal, the service with the global BBU pool mode if the speed of the user terminal is less than the threshold M1, the distance between the user terminal and the another user terminal communicating with the user terminal is larger than a threshold D1 but less than the threshold D2 and a BBU pool determines that Fog-Access Point (F-AP) communication cannot satisfy service communication requirements;
   M1, D1 and D2 are positive integers and D2 is larger than D1.

2. The method according to claim 1, wherein the non-global BBU pool mode is a High Power Node (HPN) access mode;
   if the service of the user terminal is the service, which does not need the global cooperation, transmitting, by the user terminal, the service with the non-global BBU pool mode comprises:
   transmitting, by the user terminal, the service with the HPN access mode if speed of the user terminal is larger than a threshold M1 or the user terminal needs to perform real-time voice service communication; M1 is a positive integer.

3. The method according to claim 1, wherein the non-global BBU pool mode is a terminal D2D mode;
   if the service of the user terminal is the service, which does not need the global cooperation, transmitting, by the user terminal, the service with the non-global BBU pool mode comprises:
   transmitting, by the user terminal, the service with the terminal D2D mode if speed of the user terminal is less than a threshold M1, a distance between the user terminal and another user terminal communicating with the user terminal is less than a threshold D1, both the user terminal and the another user terminal communicating with the user terminal have a D2D module and both the user terminal and the another user terminal communicating with the user terminal access a same F-AP; M1 and D1 are positive integers.

4. The method according to claim 1, wherein the non-global BBU pool mode is a local F-AP mode;
   if the service of the user terminal is the service, which does not need the global cooperation, transmitting, by the user terminal, the service with the non-global BBU pool mode comprises:
   transmitting, by the user terminal, the service with the local F-AP mode if speed of the user terminal is less than a threshold M1, a distance between the user terminal and another user terminal communicating with the user terminal is larger than D1 but less than a threshold D2 and a BBU pool determines that F-AP communication can satisfy service communication requirements; or
   transmitting, by the user terminal, the service with the local F-AP mode if the speed of the user terminal is less than the threshold M1, the distance between the user terminal and the another user terminal communicating with the user terminal is less than the threshold D1, at least one of the user terminal and the another user terminal communicating with the user terminal does not have a D2D module and the BBU pool determines that the F-AP communication can satisfy the service communication requirements; or
   transmitting, by the user terminal, the service with the local F-AP mode if the speed of the user terminal is less than the threshold M1, the distance between the user terminal and the another user terminal communicating with the user terminal is less than the threshold D1, both the user terminal and the another user terminal communicating with the user terminal have the D2D module, the user terminal and the another user terminal communicating with the user terminal do not access a same F-AP and the BBU pool determines that the F-AP communication can satisfy the service communication requirements;
   M1, D1 and D2 are positive integers and D2 is larger than D1.

5. The method according to claim 3, wherein the user terminal is a first user terminal and the another user terminal communicating with the user terminal is a second user terminal;
   before transmitting, by the user terminal, the service with the terminal D2D mode, the method further comprises:
   broadcasting, by the first user terminal, location information of the first user terminal and an identifier of the first user terminal with the identifier of the first user terminal allocated by the F-AP;
   receiving location information of the second user terminal and an identifier of the second user terminal allocated by the F-AP, which are broadcast by the second user terminal on a frequency band, which is same as that used by the first user terminal after the second user terminal receives the location information of the first user terminal and the identifier of the first user terminal; and sending, by the first user terminal, acknowledgement information to the second user terminal after the first user terminal receives the location information of the second user terminal and the identifier of the second user terminal.

6. The method according to claim 3, further comprising: periodically sending, by the user terminal, interference information of the user terminal to the F-AP, so that the F-AP adjusts the user terminal to an idle channel according to the interference information and link scheduling information and channel occupation history information stored by the F-AP or changes an access mode of the user terminal to a non-D2D access mode.

7. The method according to claim 4, further comprising: evaluating, by the user terminal, strength of a detected radio signal according to location information of the user terminal and channel state information;
obtaining transmitting power and load of different F-APs and characteristics of the service of the user terminal and performance limit of a return link;
ranking the F-APs in an order from high energy efficiency to low energy efficiency according to the transmitting power and load of the F-APs and the characteristics of the service of the user terminal and the performance limit of the return link;
accessing an F-AP with the highest energy efficiency;
accessing an F-AP with the second-highest energy efficiency if the F-AP with the highest energy efficiency does not have spare idle resource or a fronthaul of the F-AP with the highest energy efficiency is limited.

8. The method according to claim 4, further comprising: accessing, by the user terminal, the F-AP according to location information of the user terminal and channel state information, so that the F-AP determines Signal to Interference Ratio (SIR) of the user terminal, generates an interference coordination instruction if the SIR is less than or equal to a threshold R1, instructs an adjacent F-AP causing interference to release resources causing interference with the F-AP of the user terminal or instructs the adjacent F-AP causing the interference to perform joint transmission with the F-AP on a current frequency band, R1 is a positive integer.

9. The method according to claim 1, further comprising: when the user terminal and the F-AP of the user terminal perform downlink communication, periodically sending, by the user terminal, location information of the user terminal and channel state information to the BBU pool via the F-AP, so that the BBU pool performs centralized virtual precoding operation and constructs zero-interference channel zone according to the location information of the user terminal and the channel state information;
when the user terminal and the F-AP performs uplink communication, periodically sending, by the user terminal, interference information to the BBU pool via the F-AP, so that the BBU pool performs serial interference elimination computation to recover an uplink signal transmitted by the user terminal.

10. A service transmission device, comprising: a processor and a non-transitory storage medium storing machine readable instructions, which are executed by the processor to:
determine whether a service of a user terminal is a service needing global cooperation;

transmit the service with a global Base Band Unit (BBU) pool mode if the service of the user terminal is the service needing the global cooperation; and
transmit the service with a non-global BBU pool mode if the service of the user terminal is the service, which does not need the global cooperation; wherein the processor further executes the machine readable instructions to:
transmit the service with the global BBU pool mode if speed of the user terminal is less than a threshold M1, a distance between the user terminal and another user terminal communicating with the user terminal is larger than a threshold D2; or
transmit the service with the global BBU pool mode if the speed of the user terminal is less than the threshold M1, the distance between the user terminal and the another user terminal communicating with the user terminal is larger than a threshold D1 but less than the threshold D2 and a BBU pool determines that Fog-Access Point (F-AP) communication cannot satisfy service communication requirements;
M1, D1 and D2 are positive integers and D2 is larger than D1.

11. The device according to claim 10, wherein the non-global BBU pool mode is a High Power Node (HPN) access mode;
the processor further executes the machine readable instructions to:
transmit the service with the HPN access mode if speed of the user terminal is larger than a threshold M1 or the user terminal needs to perform real-time voice service communication; M1 is a positive integer.

12. The device according to claim 10, wherein the non-global BBU pool mode is a terminal D2D mode;
the processor further executes the machine readable instructions to:
transmit the service with the terminal D2D mode if speed of the user terminal is less than a threshold M1, a distance between the user terminal and another user terminal communicating with the user terminal is less than a threshold D1, both the user terminal and the another user terminal communicating with the user terminal have a D2D module and both the user terminal and the another user terminal communicating with the user terminal access a same F-AP; M1 and D1 are positive integers.

13. The device according to claim 10, wherein the non-global BBU pool mode is a local F-AP mode;
the processor further executes the machine readable instructions to:
transmit the service with the local F-AP mode if speed of the user terminal is less than a threshold M1, a distance between the user terminal and another user terminal communicating with the user terminal is larger than D1 but less than a threshold D2 and a BBU pool determines that F-AP communication can satisfy service communication requirements; or
transmit the service with the local F-AP mode if the speed of the user terminal is less than the threshold M1, the distance between the user terminal and the another user terminal communicating with the user terminal is less than the threshold D1, at least one of the user terminal and the another user terminal communicating with the user terminal does not have a D2D module and the BBU pool determines that the F-AP communication can satisfy the service communication requirements; or transmit the service with the local F-AP mode if the speed of the user terminal is less than the threshold M1, the distance between the user terminal and the another user terminal communicating with the user terminal is less than the threshold D1, both the user terminal and the another user terminal communicating with the user terminal have the D2D module, the user terminal and the another user terminal communicating with the user terminal do not access a same F-AP and the BBU pool determines that the F-AP communication can satisfy the service communication requirements;

M1, D1 and D2 are positive integers and D2 is larger than D1.

14. The device according to claim 12, wherein the user terminal is a first user terminal and the another user terminal communicating with the user terminal is a second user terminal;

the processor further executes the machine readable instructions to:

broadcast location information of the first user terminal and an identifier of the first user terminal with the identifier of the first user terminal allocated by the F-AP;

receive location information of the second user terminal and an identifier of the second user terminal allocated by the F-AP, which are broadcast by the second user terminal on a frequency band, which is same as that used by the first user terminal after the second user terminal receives the location information of the first user terminal and the identifier of the first user terminal; and send acknowledgement information to the second user terminal after the first user terminal receives the location information of the second user terminal and the identifier of the second user terminal.

15. The device according to claim 12, wherein the processor further executes the machine readable instructions to:

periodically send interference information of the user terminal to the F-AP, so that the F-AP adjusts the user terminal to an idle channel according to the interference information and link scheduling information and channel occupation history information stored by the F-AP or changes an access mode of the user terminal to a non-D2D access mode.

16. The device according to claim 13, wherein the processor further executes the machine readable instructions to:

evaluate strength of a detected radio signal according to location information of the user terminal and channel state information;

obtain transmitting power and load of different F-APs and characteristics of the service of the user terminal and performance limit of a return link;

rank the F-APs in an order from high energy efficiency to low energy efficiency according to the transmitting power and load of the F-APs and the characteristics of the service of the user terminal and the performance limit of the return link;

access an F-AP with the highest energy efficiency;

access an F-AP with the second-highest energy efficiency if the F-AP with the highest energy efficiency does not have spare idle resource or a fronthaul of the F-AP with the highest energy efficiency is limited.

17. The device according to claim 13, wherein the processor further executes the machine readable instructions to:

access the F-AP according to location information of the user terminal and channel state information, so that the F-AP determines Signal to Interference Ratio (SIR) of the user terminal, generates an interference coordination instruction if the SIR is less than or equal to a threshold R1, instructs an adjacent F-AP causing interference to release resources causing interference with the F-AP of the user terminal or instructs the adjacent F-AP causing the interference to perform joint transmission with the F-AP on a current frequency band, R1 is a positive integer.

18. The device according to claim 10, wherein the processor further executes the machine readable instructions to:

when the user terminal and the F-AP of the user terminal perform downlink communication, periodically send location information of the user terminal and channel state information to the BBU pool via the F-AP, so that the BBU pool performs centralized virtual precoding operation and constructs zero-interference channel zone according to the location information of the user terminal and the channel state information;

when the user terminal and the F-AP performs uplink communication, periodically send interference information to the BBU pool via the F-AP, so that the BBU pool performs serial interference elimination computation to recover an uplink signal transmitted by the user terminal.

* * * * *